Nov. 4, 1969

D. C. NICHOLS 3,477,009

BATTERY CHARGING CIRCUIT

Filed Dec. 2, 1966

INVENTOR
DUANE C. NICHOLS

BY *Sughrue, Rothwell, Mion, Zinn & Macpeak*
ATTORNEYS

Nov. 4, 1969   D. C. NICHOLS   3,477,009
BATTERY CHARGING CIRCUIT
Filed Dec. 2, 1966   2 Sheets-Sheet 2

INVENTOR
DUANE C. NICHOLS

BY Sughrue, Rothwell, Mion, Zinn & Macpeak
ATTORNEYS 3,477,009
Patented Nov. 4, 1969

1

3,477,009
BATTERY CHARGING CIRCUIT
Duane C. Nichols, St. Joseph, Mich., assignor to Whirlpool Corporation, a corporation of Delaware
Filed Dec. 2, 1966, Ser. No. 598,704
Int. Cl. H01m 45/04
U.S. Cl. 320—23      5 Claims

ABSTRACT OF THE DISCLOSURE

A circuit for controlling the charging rate of a three-terminal battery responsive to a signal produced by the third terminal upon approaching the battery's fully charged condition to switch the charging rate from a high rate to a lower rate or to terminate the charging of the battery.

This invention relates in general to the art of electrical storage battery charging, and more particularly to novel circuit means for controlling the rate of charging a newly developed type of storage battery or cell.

The two principal methods of battery charging control commonly employed involve detecting the temperature rise of the battery or its internal voltage rise and using these parameters as end point measurements indicative of a fully charged condition. Both of these methods are impractical for use with battery operated domestic or household appliances due to their relatively high cost and further because of their inherent use limitations. For example, the temperature of a battery also rises in response to a high discharge rate, and its internal voltage is greatly influenced by inter-cell contact resistance and internal impedance. Another method of determining the charge termination point has involved monitoring the internal pressure of the battery, but this is difficult without puncturing the cell which often results in electrolyte leakage and other problems.

A recent development in the storage battery art designed to obviate the above disadvantages is the adhydrode cell produced by Gulton Industries, Inc. Similar type batteries are being designed by other companies. The adhydrode cell or battery includes a third electrode whose electrical output increases sharply as the battery approaches a full charge level. If the third electrode and the negative electrode are externally connected together a signal flows between them as a function of the state of charge, and this current or voltage rises steeply near the end point of the charging cycle. Unfortunately this signal is very low in value, in the order of 20 milliamps at its peak, which is unsuitable for use with conventional charging control circuitry. On the other hand, existing circuitry sensitive enough to operate at such low signal levels is prohibitively expensive for home appliance usage.

It is therefore a primary object of this invention to provide a novel and inexpensive battery charging circuit specifically designed to be used with third electrode or adhydrode batteries.

It is a further object of this invention to provide such a circuit which senses the output from the third electrode of the battery and switches from the full charge rate to a trickle charge, or even to a zero charge rate, in response to a sharp rise in such output.

These and further objects and advantages of the invention are implemented in the preferred embodiments by means such as a relay circuit, a transistor circuit, and a saturable reactor circuit. One preferred embodiment is a relay circuit where the switching contacts of a reed relay are connected in parallel across a conventional relay coil whose switching position determines whether full rate or trickle charging is carried out. The reed relay coil is connected between the negative battery terminal and the third electrode, and the reed relay is also provided with an adjustable biasing coil through which the switchover point may be set. When the circuit is energized with a DC signal the normally closed reed relay contacts shunt the conventional relay coil and effect full rate charging. When the battery becomes fully charged the signal through the reed relay coil from the third electrode added to the effect of the biasing coil opens the reed relay contacts. This allows the conventional relay coil to become energized and transfer its switch arm, which terminates the full rate charge and connects a series resistor in the circuit to provide a low rate trickle charge.

A more complete understanding of the invention may be had from the following detailed description thereof taken in conjunction with the drawings, in which.

Figure 1:
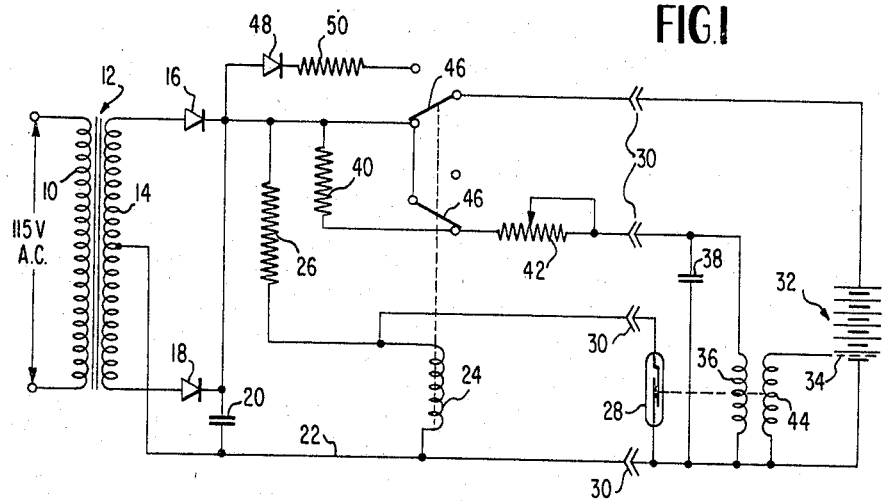
FIG. 1 shows a schematic circuit diagram of a preferred embodiment of the invention.

Referring now to the drawings, FIG. 1 shows a 115 volt 60 cycle AC source connected across the primary winding 10 of a transformer 12 whose secondary winding 14 is applied to a pair of diode rectifiers 16 and 18. The latter implement full wave rectification of the secondary signal and, in conjunction with the filter capacitor 20, supply a positive DC signal to the charge control portion of the circuit. The negative return line 22 is connected to a center tap on the secondary winding 14. A conventional relay coil 24 is connected across the DC source lines in series with a current limiting resistor 26, and the relay coil is paralleled with the normally closed switching contacts 28 of a reed relay through a four-terminal jack plug or connector 30. An array or stack 32 of eight series connected batteries is connected across two of the plug terminals with the lower battery being of the adhydrode type previously described and including a third electrode 34. In this regard it is to be noted that a single adhydrode battery may thus be used as a pilot cell to indicate the charge condition of an entire bank of conventional batteries. A biasing coil 36 for the reed relay and a parallel filtering and surge preventing capacitor 38 are connected across the DC lines in series with a regulating resistor 40 and potentiometer 42 through another one of the plug terminals, the potentiometer being used to set the switching point of the reed relay. The control coil 44 for the reed relay is connected between the third electrode 34 and the negative electrode of the adhydrode battery. The switch arms 46 associated with the relay coil 24 are transferable between the full charge rate position shown and a trickle charge position which connects the DC signal to the battery array through a diode 48 and a current limiting resistor 50. The diode 48 serves to prevent any battery discharge through the control circuitry if the AC source is interrupted.

Figure 2:
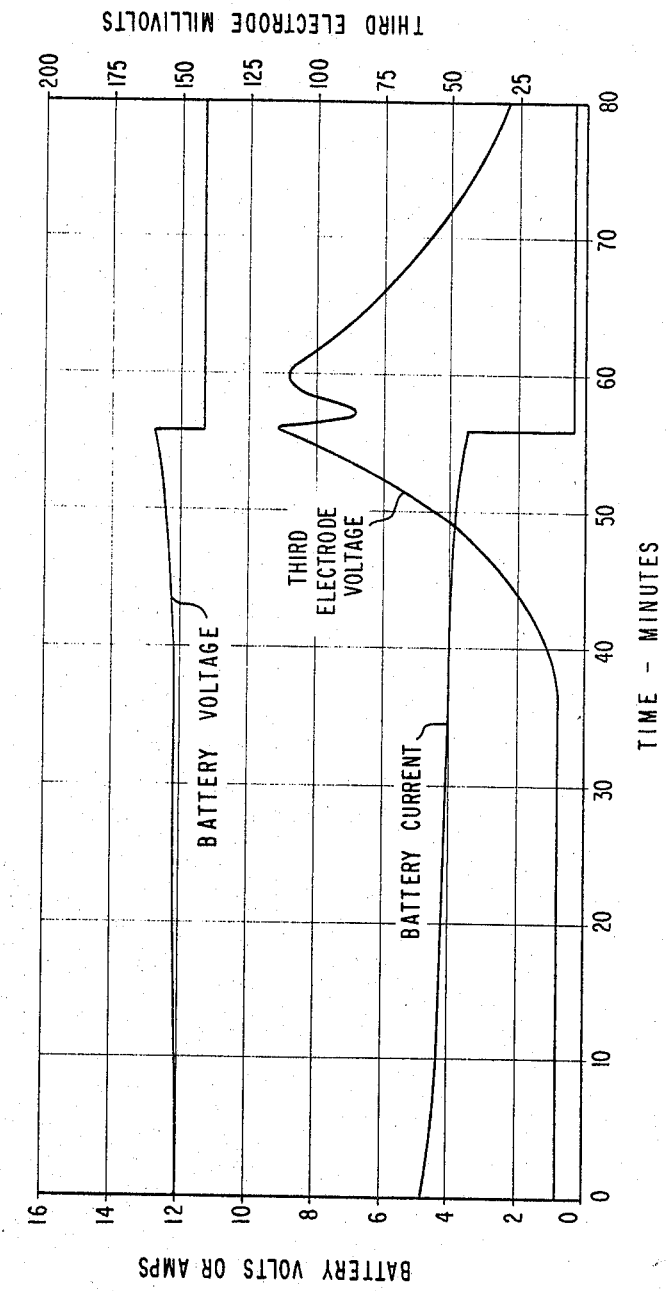
FIG. 2 shows a typical time plot of the battery voltage and current and the third electrode voltage.

Turning now to the operation of the circuit, which will be explained in conjunction with the time plots of FIG. 2, assume that the battery array 32 is initially discharged. When the jack plug 30 is connected by the setting of the appliance on its charging stand and the circuit is energized from the AC source, the current through the biasing coil 36 is insufficient to open the contacts 28 of the reed relay and they remain closed. This shunts the relay coil 24 and its switch arms 46 remain in the position shown, thus connecting the batteries directly across the DC lines to implement full rate charging. Under these conditions, and using the circuit parameters listed below, the battery current is about 4½ amps and the battery potential is 12 volts, as seen in FIG. 2. As the batteries become charged, the current gradually decreases and the voltage rises slightly. The potential of the third electrode, which is initially around 10 millivolts, also remains fairly constant until the adhydrode battery approaches its fully charged condition. Looking at FIG. 2, it is seen that the third electrode potential begins to rise sharply after 40 minutes of charging time have elapsed.

As this potential rises the current through the control coil 44 correspondingly increases until a point is reached, at 56 minutes and 115 millivolts in FIG. 2, where the added effects of the control coil and the biasing coil are sufficient to open the switching contacts 28 of the reed relay. With the shunt thus removed the relay coil 24 is immediately energized and transfers its switch arms 46. The upper arm in FIG. 1 now places diode 48 and resistor 50 in series with the batteries to limit the charging current to a trickle rate of approximately 0.4 amps. The lower arm removes its shunt of resistor 40 which now provides some compensation for the poor voltage regulation of transformer 12. The trickle current is designed to maintain the battery array 32 fully charged over long periods of non-use without overcharging it. When the appliance or other portable apparatus powered by and containing the batteries is to be used, the jack plug 30 is simply disconnected which frees the battery circuit from the bulk of the charge control circuit.

A further advantage of the control circuit shown is that a certain amount of feedback is obtained through the biasing coil 36 as the terminal voltage across the batteries increases during charging. This results in a lower third electrode voltage switching point for the reed relay for a nearly charged battery array than for a discharged array, which eliminates the possibility of overcharging for very short duty cycle periods.

The typical time curves plotted in FIG. 2 were obtained with the circuit of FIG. 1 employing the following components:

| | |
|---|---|
| Transformer 12 | Grand Transformer #S-791-A. |
| Diodes 16 and 18 | Westinghouse 366B. |
| Diode 48 | General Electric IN601. |
| Capacitors 20 and 38 | 400 microfarads. |
| Relay 24, 46 | Potter Brumfield #MR11D. |
| Biasing coil 36 | 1000 turns of #36 wire. |
| Control coil 44 | 2500 turns of #32 wire. |
| Contacts 28 | Gordos Reed Switch #MR 806 (N.C.). |
| Resistor 26 | 40 ohms. |
| Resistor 40 | 82 ohms. |
| Potentiometer 42 | 0-150 ohms. |
| Resistor 50 | 52 ohms. |

Figures 3A, 3B:
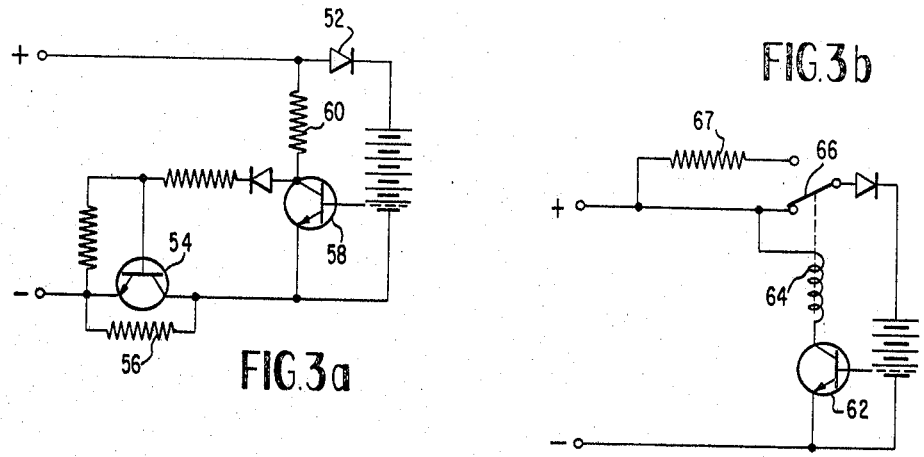
FIGS. 3A and 3B show schematic circuit diagrams of transistorized embodiments of the invention.

FIGS. 3A and 3B show two alternate and greatly simplified embodiments of the invention employing conventional transistors rather than a reed relay to sense the third electrode signal. In FIG. 3A the DC source supplied to the input terminals charges the battery array directly through diode 52 and the parallel combination of transistor 54 and trickle resistor 56. The transistor is normally conducting since its base is at the positive source potential due to the non-conduction of transistor 58. As the batteries become charged the third electrode potential rises until transistor 58 is rendered conductive. This causes a large voltage drop across resistor 60 which lowers the base potential of transistor 54, and this in turn switches the transistor off to reduce the charging current from full rate to a trickle charge level through resistor 56. In FIG. 3B transistor 62 is turned on as the batteries reach their fully charged condition by the rising potential of the third electrode applied to the transistor base terminal. This energizes the relay coil 64 connected in the collector circuit of the transistor which then transfers switch 66 from the full rate charging position shown to the trickle charge resistor 67.

Figure 4:
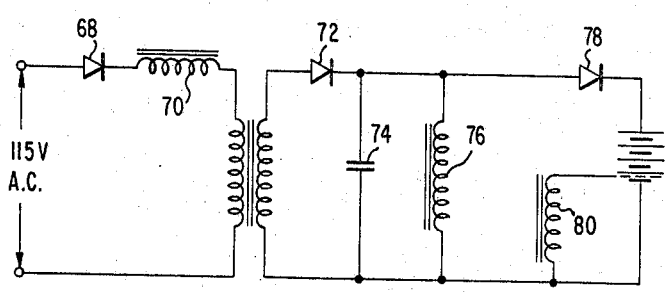
FIG. 4 shows a schematic circuit diagram of a saturable reactor embodiment of the invention.

The embodiment shown in FIG. 4 employs a saturable core reactor as the sensing and control means. The AC supply signal is half-wave rectified by diode 68 and applied to the primary winding of the coupling transformer through a gate winding 70 of a saturable core reactor. The output from the secondary winding of the transformer is rectified by diode 72, filtered by capacitor 74, and applied across a reactor bias winding 76 and across the battery array through a diode 78. The control winding 80 of the saturable reactor is connected between the third electrode of the adhydrode cell and its negative electrode, as before. The gate winding 70, bias winding 76 and control winding 80 are all wound on the same magnetically saturable core piece.

When the battery array is in a low state of charge a relatively small current flows through the control winding 80 and the AC supply saturates the reatcor core during positive half cycles. Since the reactor offers a very low impedance when saturated a full rate charging current is therefore coupled through the transformer to the batteries. As the battery array approaches the fully charged condition the increased signal through control winding 80 from the third electrode opposes or retards core saturation, and at some pre-set level this control signal will be sufficient to completely prevent saturation. Under this condition the gate winding 70 will present a relatively high impedance to the AC signal and the current applied to the coupling transformer is thus reduced to the desired trickle level. The parameters of the bias winding 76 are chosen to provide the desired saturation point control.

While the invention has been particularly shown and described with reference to preferred embodiments thereof, it will be understood by those skilled in the art that various changes in form and details may be made therein without departing from the spirit and scope of the invention.

What is claimed is:

1. An electrical circuit for controlling the charging of a battery having positive and negative electrodes and a third electrode whose signal increases rapidly as the battery approaches its fully charged condition, comprising:
   (a) a source of DC charging current,
   (b) high and low impedance paths connecting the source of DC current across the battery,
   (c) a first electrical relay having a sensing coil connected between the third electrode and the negative electrode for sensing the signal of the third electrode, a biasing coil connected in series with a potentiometer across the DC source for adjusting the switching point of the first relay, and a switch, and
   (d) a second electrical relay whose energization is controlled by the first relay switch for selecting the low impedance path when a low signal is sensed at the third electrode and for selecting the high impedance path when the third electrode signal rises above a threshold level to thereby reduce the high charging current to a lesser magnitude.

2. An electrical circuit as defined in claim 1 wherein the DC source comprises:
   (a) an AC source,
   (b) a transformer for reducing the voltage of the AC source, and
   (c) means for rectifying and filtering the reduced AC voltage from the transformer.

3. An electrical circuit for controlling the charging of a battery having positive and negative electrodes and a third electrode whose signal increases rapidly as the battery approaches its fully charged condition, comprising:
   (a) an AC source,
   (b) means connected across the AC source for transforming its voltage to a lower value,
   (c) means for rectifying and filtering the transformed voltage into a source of relatively high DC charging current for the battery, and
   (d) a saturable core reactor having a control winding connected between the third electrode and the negative electrode for sensing the signal of the third electrode, and a gate winding connected between the AC source and the transforming means, whereby the saturable core reactor reduces the high charging current to a lesser magnitude in a response to a rise in the third electrode signal above a threshold level.

4. An electrical circuit as defined in claim 3 further comprising a bias winding wound on the saturable core reactor and connected across the DC source.

5. An electrical circuit for controlling the charging of a battery having positive and negative electrodes and a third electrode whose signal increases rapidly as the battery approaches its fully charged condition, comprising:
 (a) a source of DC charging current,
 (b) means for connecting the DC source across the battery to supply it with a relatively high charging current,
 (c) a first transistor having its base connected to the third electrode and its emitter connected to the negative electrode for sensing the signal of the third electrode, and
 (d) a second transistor whose emitter-collector terminals are connected in series between said DC source and the battery and whose base is connected to the collector terminal on the first transistor, whereby the second transistor reduces the high charging current to a lesser magnitude when the third electrode signal rises above a threshold level.

References Cited

UNITED STATES PATENTS

| | | | |
|---|---|---|---|
| 2,509,252 | 5/1950 | Salazar | 320—23 |
| 2,578,027 | 12/1951 | Tichenor | 320—46 |
| 2,957,117 | 10/1960 | Lapuyade | 320—39 X |
| 2,978,633 | 4/1961 | Medlar | 323—89 |
| 3,005,943 | 10/1961 | Jaffe | 320—46 X |
| 3,241,029 | 3/1966 | Slomski | 320—40 |
| 3,281,639 | 10/1966 | Potter et al. | 320—43 |

LEE T. HIX, Primary Examiner

STANLEY WEINBERG, Assistant Examiner